(12) United States Patent
Rajpathak et al.

(10) Patent No.: US 10,062,222 B2
(45) Date of Patent: *Aug. 28, 2018

(54) ANALYZING MULTILINGUAL DIAGNOSTIC RECORDS

(71) Applicant: GM Global Technology Operations LLC, Detroit, MI (US)

(72) Inventors: Dnyanesh G. Rajpathak, Troy, MI (US); Soumen De, Karnataka (IN)

(73) Assignee: GM Global Technology Operations LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/949,614

(22) Filed: Nov. 23, 2015

(65) Prior Publication Data

US 2017/0148233 A1    May 25, 2017

(51) Int. Cl.

| G06F 17/27 | (2006.01) |
|---|---|
| G07C 5/08 | (2006.01) |
| G06N 99/00 | (2010.01) |
| G06F 17/30 | (2006.01) |
| G07C 5/00 | (2006.01) |

(52) U.S. Cl.
CPC .......... *G07C 5/085* (2013.01); *G06F 17/277* (2013.01); *G06F 17/2735* (2013.01); *G06F 17/30598* (2013.01); *G06N 99/005* (2013.01); *G07C 5/00* (2013.01); *G07C 5/006* (2013.01)

(58) Field of Classification Search
CPC ........ G07C 5/00; G07C 5/006; G06F 17/2735
USPC ....................... 704/9, 10; 701/29.1
See application file for complete search history.

(56) References Cited

U.S. PATENT DOCUMENTS

| 6,311,152 | B1 * | 10/2001 | Bai ................... G06F 17/277 704/251 |
|---|---|---|---|
| 6,405,162 | B1 * | 6/2002 | Segond ............... G06F 17/274 704/9 |
| 6,768,935 | B1 * | 7/2004 | Morgan ............... G06Q 10/10 701/29.6 |
| 7,092,937 | B2 * | 8/2006 | Morgan ............... G06Q 10/06 707/736 |
| 7,580,971 | B1 * | 8/2009 | Gollapudi ......... G06F 17/30474 709/203 |
| 8,190,423 | B2 * | 5/2012 | Rehberg ............. G06F 17/2785 704/10 |
| 9,672,497 | B1 * | 6/2017 | Lewis ................. G06Q 10/20 |
| 2006/0069473 | A1 * | 3/2006 | Sumcad ................ G07C 5/008 701/29.3 |
| 2006/0173886 | A1 * | 8/2006 | Moulinier ......... G06F 17/30616 |
| 2006/0242191 | A1 * | 10/2006 | Kutsumi ............ G06F 17/2735 |
| 2011/0258229 | A1 * | 10/2011 | Ni ....................... G06F 17/277 707/776 |
| 2012/0158718 | A1 * | 6/2012 | Transier ............ G06F 17/30622 707/730 |
| 2013/0218555 | A1 * | 8/2013 | Kikuchi ................ G06F 17/274 704/9 |

* cited by examiner

*Primary Examiner* — Shaun Roberts
(74) *Attorney, Agent, or Firm* — Reising Ethington P.C.

(57) ABSTRACT

A system and method of analyzing content of multilingual vehicle diagnostic records includes: determining a word window within a vehicle diagnostic record; identifying a pair or a tuple comprising parts, symptoms, or actions; generating a plurality of pairs or tuples comprising parts, symptoms, or actions; determining a frequency value for each pair or tuple; and comparing the determined frequency value with a predetermined threshold.

16 Claims, 5 Drawing Sheets

US 10,062,222 B2

ANALYZING MULTILINGUAL DIAGNOSTIC RECORDS

TECHNICAL FIELD

The present invention relates to vehicle operation and, more particularly, to analyzing vehicle diagnostic records reflecting vehicle operation or service.

BACKGROUND

Vehicle owners occasionally have problems with their vehicles that can be resolved by a visit to a vehicle service center. There, a vehicle technician can listen to vehicle owners explain the symptoms of the problem, observe the problem themselves, diagnose the cause of the problem, and provide a solution. As part of maintaining a record of service for a vehicle, the vehicle technician generally writes down the part(s) of the vehicle affected by the problem, the symptom(s) of the problem the vehicle owner or technician observed, and the action(s) taken to resolve the problem in a vehicle diagnostic record.

Apart from providing a record of vehicle service, the vehicle diagnostic records for a large number of serviced vehicles can be used to gather information about vehicle operation and/or service for a fleet of vehicles. However, as both the number of vehicles and the geographic area where the vehicles are used increases, so too does the complexity of analyzing the vehicle diagnostic records for those vehicles. For example, a particular vehicle model may be deployed in a large area encompassing different countries where vehicle technicians speak different languages. That is, one country may have vehicle technicians that speak different languages or the vehicle may be sold in different countries each of which has its own language. The vehicle technicians servicing the same model vehicle over a large geographic area may create vehicle diagnostic records in different languages. When the vehicle diagnostic records are received in different languages, human operators competent in a particular language analyze the content of the vehicle diagnostic records written in that language and determine what the records say.

But this can create a number of problems. Relying on human interpretation and translation of words or sentences can introduce unwanted error into the analysis of the vehicle diagnostic records. Translated diagnostic records tend to miss out on the original structure and semantics of a language, which makes it difficult to interpret the records. That is, different human operators can interpret the same vehicle diagnostic record in different ways. These variable interpretations add undesirable uncertainty to the analysis of the vehicle diagnostic records. Also, the use of human translators to initially translate data can result in inefficiencies when processing large amounts of vehicle diagnostic records. And the words or sentences included in the vehicle diagnostic record may convey different information depending on the language. Thus, it would be helpful to process vehicle diagnostic records for a fleet of vehicles in a way that identifies words or sentences without regard for the language in which the vehicle diagnostic records are maintained.

SUMMARY

According to an embodiment of the invention, there is provided a method of analyzing content of multilingual vehicle diagnostic records. The method includes determining a word window within a vehicle diagnostic record; identifying a pair or a tuple comprising parts, symptoms, or actions; generating a plurality of pairs or tuples comprising parts, symptoms, or actions; determining a frequency value for each pair or tuple; and comparing the determined frequency value with a predetermined threshold.

According to another embodiment of the invention, there is provided a method of analyzing content of multilingual vehicle diagnostic records. The method includes identifying a focal word in a vehicle diagnostic record; determining a word window that includes the focal word; generating a plurality of unique pairs or tuples comprising parts, symptoms, or actions; determining a frequency value for each unique pair or tuple; and comparing the determined frequency value with a predetermined threshold.

According to yet another embodiment of the invention, there is provided a method of analyzing content of multilingual vehicle diagnostic records. The method includes classifying one or more words within a vehicle diagnostic record as a part, a symptom, or an action; identifying a focal word in the vehicle diagnostic record; determining a word window that includes the focal word; generating a plurality of unique pairs or tuples comprising parts, symptoms, or actions; determining a frequency value for each unique pair or tuple; and comparing the determined frequency value with a predetermined threshold.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
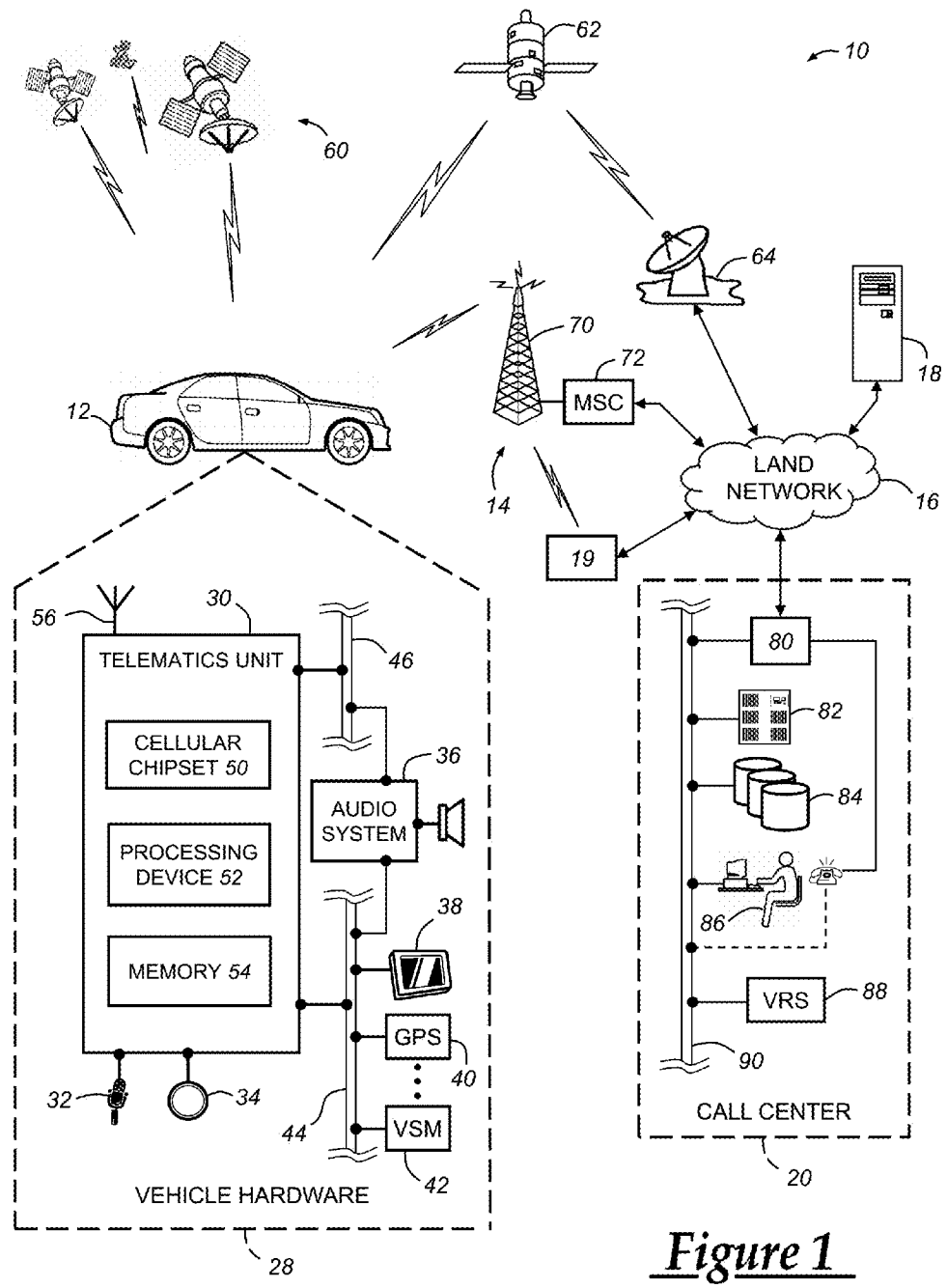
FIG. 1 is a block diagram depicting an embodiment of a communications system that is capable of utilizing the method disclosed herein.

The system and method described below analyzes vehicle diagnostic records processed using a trained database. Vehicle diagnostic records generated by vehicle technicians include text describing vehicle service provided for a particular vehicle. As pointed out above, this text can include a wide variety of different languages. Rather than manually examine each vehicle diagnostic record and identify words in the vehicle diagnostic record according to a particular classification, word positions in the vehicle diagnostic record can be classified according to what type of word is most likely to be found in a particular position in the vehicle diagnostic record. That is, when a group of vehicle diagnostic records are reviewed as part of a database training phase, the number of words of each vehicle diagnostic record in the group can be calculated and a word position assigned to each of the number of words. Each word position in the vehicle diagnostic records can then be classified, such as by whether the word relates to a part, a symptom, a failure mode, or an action. As more and more vehicle diagnostic records are analyzed, patterns emerge for vehicle diagnostic records having differing amounts of words. It should be appreciated that the term "vehicle diagnostic record" as it is described with the disclosed methods should be broadly viewed as implemented not only using content related to a vehicular environment but also to the possible analysis of medical records, or other diagnostic subject matter other than those detailing vehicle service.

At the conclusion of the training period, the database can store probable classifications for word positions of vehicle diagnostic records having different quantities of words. Later, when subsequent vehicle diagnostic records are analyzed using the trained database, the records can be processed without regard to the language of the text. Vehicle diagnostic records containing Korean, Thai, or Chinese characters can be processed by users who do not understand those languages. Each vehicle diagnostic record can be processed to determine the number of words it includes. The database may then be accessed and one or more probable classifications for word positions in the vehicle diagnostic record can be determined based on the number of words in the vehicle diagnostic record. At least some of the words in each vehicle diagnostic record can then be classified according to the probable classification in the database.

Once the words in the vehicle diagnostic record have been classified, the database can analyze the relative positioning between parts, symptoms, failure modes, and actions in vehicle diagnostic records to identify relationships between them. Unique combinations of parts and symptoms, symptoms and failure modes, failure modes and actions, as well as parts and actions can be grouped together and processed to identify the frequency with which each of these unique pairs occur. In addition to pairs, the parts, symptoms, and actions can be grouped into unique tuples comprising three terms or words and then processed to determine the frequency with which each tuple occurs. As part of creating the pairs or tuples, a part, symptom, or action can be selected as a focal word and the text content in the vehicle diagnostic record surrounding the focal word can be processed while ignoring other words in the vehicle diagnostic record. The text content can be defined by a word window that surrounds the focal word and can be sized based on a threshold number of words. The threshold number of words can be employed to limit the scope within the vehicle diagnostic record that is analyzed.

Multilingual vehicle diagnostic records can be automatically analyzed to identify parts, symptoms, failure modes, and actions and then used to automatically construct tuples by using the identified parts, symptoms, failure modes, and actions. Newly constructed tuples which are above a specific threshold can be used in a frequently or co-occurring terms based clustering algorithm. The clustering algorithm can gather the vehicle diagnostic data initially to show frequently observed faulty/failed parts. A user can then visualize associations among parts, symptoms, failure modes, and actions at a submenu when a user clicks on a specific faulty part all the symptoms associated with the faulty part can be displayed. In a next stage a user can click on one of the symptoms and the failure modes associated with the symptom may be displayed. Finally the user can click on any failure mode to visualize the repair actions that may be associated with it. That is, this clustering algorithm can automatically facilitate a user's ability to drill down from a large quantity of data to identify faulty parts, corresponding symptoms, associated failure modes, and repair actions performed.

Once the pairs and triples are constructed and their criticality has been estimated on aggregated data by using a term frequency inverse document frequency matrix, the high frequency pairs and tuples can be retained as data features. These data features along with original vehicle diagnostic records can be provided as input to a frequently co-occurring clustering algorithm. This algorithm can build clusters at a first level in which there are a number of clusters equal to the number faulty/failed parts observed in the data. Then, within each cluster of faulty/failed part, sub-clusters can be constructed to allow users to identify all possible symptoms associated with the faulty/failed parts, (part, $symptom_j$), where $part_i = (part_1, part_2, \ldots, part_k)$ and $symptom_j = (symptom_1, symptom_2, \ldots, symptom_k)$. Then, at a next stage, further subclusters can be constructed to identify all the failure modes that are associated with a specific symptom, (symptom failure $mode_j$), where $symptom_i = (symptom_1, symptom_2, \ldots, symptom_k)$ and failure $mode_j = (failure\ mode_1, failure\ mode_2, \ldots, failure\ mode_k)$. Finally, a last sub-cluster can be constructed in order to highlight all the repair actions that vehicle service providers from different geographic locations have performed when a specific failure mode associated with a specific symptom related to a specific part is observed, that is (failure $mode_i$ $action_j$), where failure $mode_i = (failure\ mode_1, failure\ mode_2, \ldots, failure\ mode_k)$ and $action_j = (action_1, action_2, \ldots, action_k)$.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, a vehicle service center 19, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

The service center 19 is a location where vehicle owners bring the vehicle 12 for routine maintenance or resolution of vehicle trouble. There, vehicle technicians can observe the vehicle and analyze vehicle trouble using a variety of tools, such as computer-based scan tools that obtain diagnostic trouble codes (DTCs) stored in the vehicle 12. As part of maintaining the vehicle 12 or analyzing vehicle trouble, vehicle technicians may memorialize the analysis in a vehicle diagnostic report, which can include the parts affected, the symptoms observed or reported, and the actions carried out by the vehicle technicians. The vehicle diagnostic records for vehicles serviced by the service center 19 can be stored at the center 19 or transmitted to a central facility, such as the computer 18 or call center 20, via the wireless carrier system 14 and/or the land network 16.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
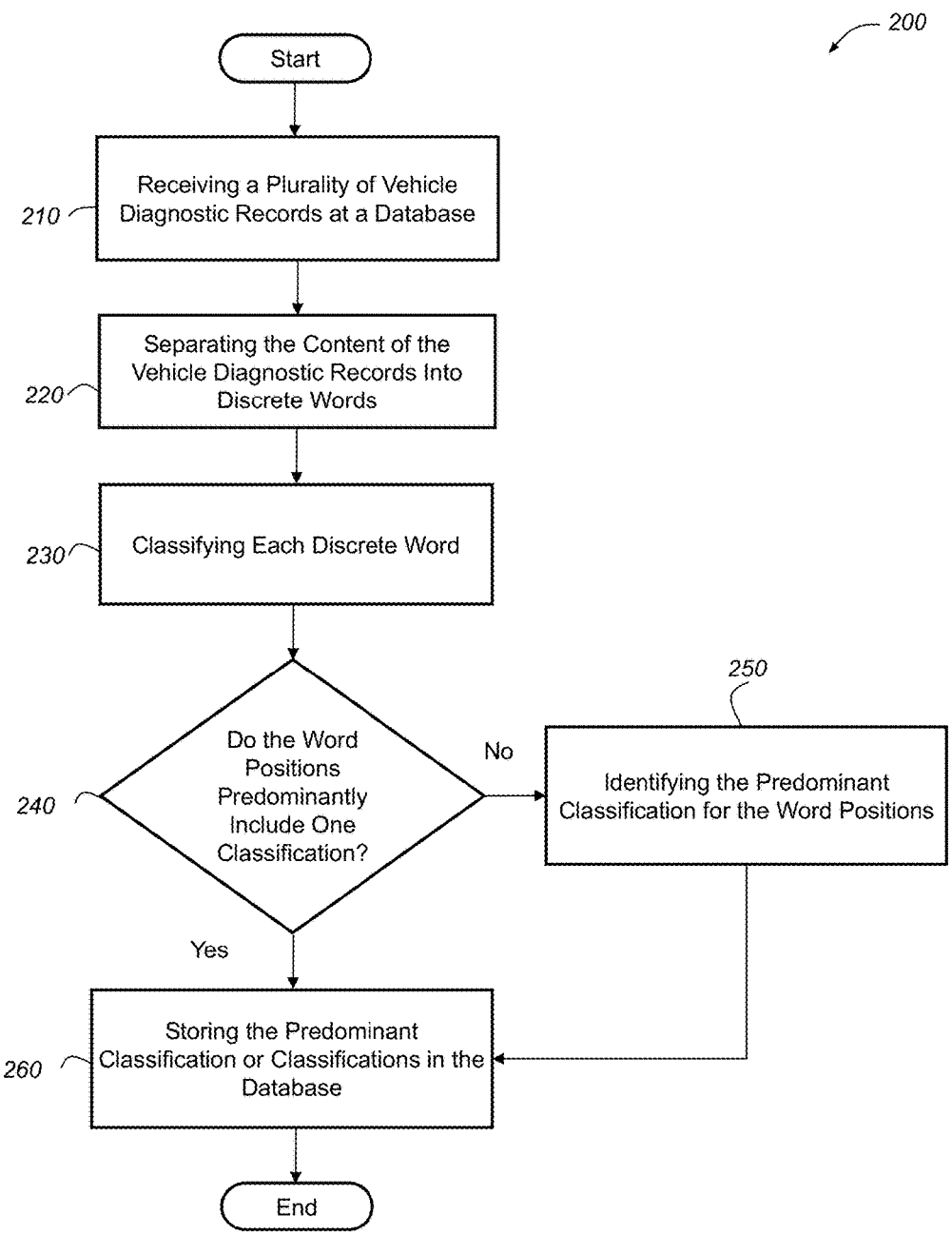
FIG. 2 is a flow chart depicting an embodiment of a method of training a database to analyze vehicle diagnostic records.

Turning now to FIG. 2, there is shown a method 200 of training a database to process vehicle diagnostic records. The method 210 begins by receiving a plurality of vehicle diagnostic records at the database. Vehicle diagnostic records can include text that describes the service performed for the vehicle 12. Vehicle technicians working at a vehicle service center can record in narrative form the service performed for the vehicle 12. In some implementations, the vehicle diagnostic record can include words in the text that are categorized as a part, a symptom, a failure mode, or an action. A part describes an element of the vehicle 12 that may be affected by a problem. The part could be tangible, such as a power window motor, vehicle brake pads, or an exterior light bulb, to name a few examples. Or the part could be intangible, such as vehicle software. Symptoms can describe one or more problems afflicting the vehicle 12. For instance, the symptom words can include descriptors such as "squealing," "inoperative," "malfunctioning," "pulsating," "noisy" or other similar language. The failure mode can represent a manner in which a part failure can occur. For example, using a hypothetical symptom "vehicle losing power," an associated failure mode can be "ECM Relay not working properly" or "ECM wires chaffed." And the action words can describe what the vehicle technician did to remedy the problem. The action words can include words like "replaced," "lubricated," "adjusted," or "calibrated." In one example, vehicle technician may service a 2011 Chevrolet Malibu and as part of the service create a vehicle diagnostic record that states "THE VEHICLE BRAKES ARE SQUEALING AND PULSATING; REPLACED THE BRAKE PADS AND FRONT ROTORS." In this example, the vehicle diagnostic report can identify the year and make of the vehicle 12 as well as include parts (VEHICLE BRAKES; FRONT ROTORS), symptoms (SQUEALING; PULSATING), and actions (REPLACED). The part words, symptom words, failure mode words, and action words specifically identified above have been provided as examples and are not a comprehensive list of all the potential words that can be classified as parts, symptoms, failure modes, or actions and it should be appreciated that other possibilities exist. Each of the part words, symptom words, and action words can relate to each other.

Vehicle diagnostic records can be generated from a fleet of vehicles and transmitted to a central facility where the records can be processed. Vehicle manufacturers sell their vehicles to many people or entities in a wide variety of geographic areas. In each of the geographic areas, the vehicle service facility 19 can provide diagnostic service to the vehicles 12. There, vehicle technicians can perform vehicle service and memorialize the service in a vehicle diagnostic record by describing the symptoms of the problem, the parts affected, or the actions carried out to end the symptoms and fix the part. The vehicle diagnostic record can include words that describe the parts, the symptoms, and the actions involved in servicing the vehicle 12. Each vehicle diagnostic record can be transmitted from a vehicle service facility to a central facility, such as the computer 18 or the call center 20, where the records are aggregated and either used to train a database or processed using the trained database. However, the computing hardware capable of carrying out the training and testing phases of vehicle diagnostic record analysis with respect to the database could be implemented in a wide variety of locations. In one embodiment, the methods described herein can be executed by a personal computer (PC) having a 2.8 GHz Intel Core i7 processor operating Windows 7 64 bit operating system with 32 GB of RAM. The database discussed herein as well as dictionaries accessed as part of training or using the database can be stored in computer-readable memory devices, such as the PC hard drive, and accessed at the direction of the processor. The method 200 proceeds to step 220.

At step 220, the content of the vehicle diagnostic records is separated into discrete words each of which is identified by a word position within the vehicle diagnostic record. The words in the vehicle diagnostic record can be identified according to its position relative to the other words in the vehicle diagnostic record, which can be carried out by determining how many words are included in a particular vehicle diagnostic record and assigning a numerical value to each word in the text of the vehicle diagnostic record reflecting the position of one word relative to the other words in the vehicle diagnostic record. For instance, the first three words of a vehicle diagnostic record can be labeled word one, word two, and word three, respectively, each indicating a word position within the vehicle diagnostic record. This numbering pattern continues until all of the words in the vehicle diagnostic record are assigned a number. For instance, in a twenty-word vehicle diagnostic record, word number ten is located before word number eleven and after number nine. It is possible to begin numbering using any number (e.g., 0 or 1) and continue sequentially for each word in the vehicle diagnostic record.

In some implementations, the vehicle diagnostic records can also be pre-processed to remove unnecessary content. This pre-processing can include removal of any stop words or special characters included in the vehicle diagnostic record. Special characters include the English equivalent of exclamation points, hyphens, and quotation marks, while stop words can include the English equivalent of articles, such as "the," "an," or "and." However, while deleting the stop words it is possible to check and see if correct stop words are deleted and by deleting the stop words the original meaning of the phrase does not change. For example, in a phrase "PCM is not working" the word 'is' and 'not' may be identified as stop words, but in this case deleting such words would change the meaning of text. Pre-processing can occur before the vehicle diagnostic record is separated into discrete words. The pre-processing can be carried out by comparing character strings found in the vehicle diagnostic record with words included in a dictionary. Character strings can refer to a plurality of the individual characters that comprise a language, such as letters in English or individual Chinese language characters, which occur in order. In English, a character string could include the letters T-H-E comprising the article "the." When a match between the character strings in the vehicle diagnostic record and the dictionary is found with a sufficient degree of confidence (e.g., above a 95% confidence threshold), then the character strings may not comprise a stop word or special character. However, if the string of characters in the vehicle diagnostic record is not found in the dictionary with a sufficient degree of confidence, then the string of characters may be classified as a stop word or special character and deleted from the vehicle diagnostic record. Dictionaries can be created to include particular words commonly found in vehicle diagnostic records (e.g., "brakes") and exclude stop words (e.g., "the"). By controlling the content of the dictionary, stop words such as "the" can be identified by its absence from the dictionary. The method 200 proceeds to step 230.

At step 230, each discrete word in the vehicle diagnostic record can be classified. The discrete words in the vehicle diagnostic record can be compared with a dictionary that includes words categorized according to whether the word relates to a part, a symptom, a failure mode, or an action. A dictionary of words can be created that includes commonly-used words that describe either a part, a symptom, a failure mode, or an action. When the discrete words in each vehicle diagnostic record are analyzed, the dictionary can be searched to determine if a match exists. If so, the category the word is stored with in the dictionary can be determined and used to classify the discrete word in the vehicle diagnostic record. This process can be repeated until each word in the vehicle diagnostic record is classified as a part, a symptom, or an action. The method 200 proceeds to step 240.

At step 240, one or more word positions within the vehicle diagnostic records are analyzed to determine whether they predominantly include one classification. As a statistically significant number of vehicle diagnostic records are analyzed, the frequency with which words having a particular classification appear is determined for particular word positions in vehicle diagnostic records having differing quantities of words. A confidence threshold can be established to determine whether a word position is predominantly one classification. When the percentage of words at one or more particular word positions are classified according to one type of classification at a rate above the confidence threshold, the word positions are labeled as including that type of classification.

For example, if five hundred vehicle diagnostic records are analyzed and more than 60% of the words at positions number four through six are classified as parts, the database can be instructed to thereafter classify words four through six as "parts" for the vehicle diagnostic records it subsequently analyzes. And the database can be instructed differently depending on the amount of words included in the vehicle diagnostic reports. Using the last example, it may be determined that more than 60% of vehicle diagnostic reports having twenty-five words include "part" words in word positions four through six. But when analyzing vehicle diagnostic reports having different amounts of words, different word positions may be characterized as "parts," "symptoms," "failure modes," and "actions." In another example, with respect to vehicle diagnostic reports that are thirty-eight words long, word positions three through five may be classified as "parts" at a rate above the threshold (e.g., more than 60% of the time). And word position 7 can be classified as a symptom word. If the analyzed vehicle diagnostic records do not meet the threshold that indicates a predominant classification for one or more word positions, the method 200 proceeds to step 250. Otherwise, the method 200 proceeds to step 260.

At step 250, one or more word positions are determined to have a plurality of probable classifications. When more than one probable classification exists for one or more word positions, then a predominant classification can be identified among the plurality of probable classifications for the one or more word position(s). Some vehicle diagnostic records may have two or more classifications for one or more word positions. Analysis of a word position within a statistically significant number of processed vehicle diagnostic records may not result in one classification that is significantly more frequent than others. In one example, two or three classifications may occur with similar frequency. When such a condition exists, the relative probabilities of each classification for each word position can be calculated and compared. The highest relative probability among the classifications for a word position can then be used to select one of the classifications to assign to the word position. Table I below depicts word positions that have been classified as having two or three simultaneous classifications. The first column of the table indicates the length, in words, of vehicle diagnostic records and the subsequent columns indicate the word position or word position ranges that share the classifications. The classifications are "action-part," "action-symptom," "part-symptom," and "action-part-symptom."

TABLE I

| LENGTH | | | | | | | | | | |
|---|---|---|---|---|---|---|---|---|---|---|
| ACTION-PART | | | | | | | | | | |
| 25 | 2-3 | 8-9 | 3-4 | 10-11 | 14-15 | 20-21 | 7-8 | — | — | — |
| 26 | 7-9 | 5-6 | 9-11 | 14-15 | 2-6 | — | — | — | — | — |
| 44 | 2-3 | 12-14 | 12-13 | 14-15 | 10-11 | 9-10 | 27-28 | 2-4 | 7-10 | 0-2 |
| 45 | 11-12 | 10-12 | 32-34 | 2-3 | 31-32 | 5-8 | 6-8 | 16-18 | 8-11 | 8-10 |
| 180 | 30-32 | — | — | — | — | — | — | — | — | — |
| 183 | 23-25 | 18-19 | — | — | — | — | — | — | — | — |
| 188 | 14-15 | — | — | — | — | — | — | — | — | — |
| 189 | 25-26 | — | — | — | — | — | — | — | — | — |
| 190 | 71-73 | 77-78 | 0-1 | — | — | — | — | — | — | — |
| ACTION-SYMPTOM | | | | | | | | | | |
| | 17-18 | 19-20 | 23-23 | — | — | — | — | — | — | — |
| | 23-24 | 9-10 | 23-23 | 15-16 | 5-5 | — | — | — | — | — |
| | 18-19 | 0-1 | 9-9 | 29-30 | 40-41 | 14-17 | 6-6 | 41-41 | 36-37 | 23-26 |
| | 27-27 | 39-40 | 27-30 | 5-5 | 21-24 | 42-42 | 34-35 | 35-36 | 41-41 | 41-42 |
| | — | | | | | | | | | |

TABLE I-continued

| LENGTH | | | | | | | | | |
|---|---|---|---|---|---|---|---|---|---|
| 157-158 | 115-116 | — | — | — | — | — | — | — | — |
| — | — | | | | | | | | |
| 152-153 | — | | | | | | | | |
| — | — | | | | | | | | |
| PART-SYMPTOM | | | | | | | | | |
| 21-22 | 15-17 | — | — | — | — | — | — | — | |
| 2-3 | 16-16 | 15-17 | 12-14 | — | — | — | — | — | |
| 19-21 | 26-27 | 18-20 | 16-16 | 33-33 | 28-30 | 13-16 | 24-26 | 39-41 | 37-38 |
| 40-41 | 14-16 | 32-33 | 16-19 | 17-17 | 12-14 | 15-17 | 35-35 | 19-19 | 34-34 |
| 91-93 | 175-177 | — | — | — | — | — | — | — | |
| 61-63 | — | | | | | | | | |
| 52-54 | — | | | | | | | | |
| 104-106 | 185-187 | — | — | — | — | — | — | — | |
| — | — | | | | | | | | |
| ACTION-PART-SYMPTOM | | | | | | | | | |
| 22-23 | 13-14 | 11-12 | 9-10 | 15-16 | — | — | — | — | |
| 13-14 | 3-4 | 12-13 | 10-11 | — | — | — | — | — | |
| 15-16 | 5-6 | 23-24 | 13-14 | 41-42 | 6-7 | 17-18 | 22-23 | 25-26 | 20-21 |
| 27-28 | 14-15 | 25-26 | 16-17 | 21-22 | 23-24 | 18-19 | 13-14 | 22-23 | 40-43 |
| — | — | | | | | | | | |
| — | — | | | | | | | | |
| — | — | | | | | | | | |
| 21-22 | — | | | | | | | | |

A Naïve Bayes model can be used to calculate the relative probabilities between different classifications at one or more word positions. The model can include the probability (PR) as follows: PR(part|word position), PR(symptom|word position), and PR(action|word position). These probabilities can be compared when multiple classifications for one or more word positions exist. The word position can then be labeled or assigned a classification associated with the highest relative probability.

In another implementation, the classifications of nearby word positions can be used to select a classification for a word position when more than one classification exists. A left and right context value can be established that defines how many word positions to the left and the right of a particular word position will be considered. For example, in a vehicle diagnostic record comprising 100 words, the word positions 59-61 may be initially classified as being a part, a symptom, and/or an action. The left and right context values can be set at three, which means that three word positions to the left and right of 59-61 will be analyzed (i.e., 56-58 and 62-64). A part context score, a symptom context score, and an action context score can be determined by counting the number of times the word positions to the left and the right of the analyzed word position are classified as a part, a symptom, or an action, respectively. The highest score can be determined and the analyzed word position can be classified based on the classification associated with the highest score. The method proceeds to step 260.

At step 260, the classification or predominant classification for one or more word positions is stored in the database. For vehicle diagnostic records having a particular number or quantity of words, one or more word positions are assigned a classification, such as part, symptom, or action. The database can then be partitioned according to word quantities and one or more word positions within vehicle diagnostic records having the word quantity can then be classified as a part, a symptom, or an action. The database can then be accessed during a use or testing phase that categorizes words found in subsequently analyzed vehicle diagnostic records. The method 200 then ends.

Figure 3:
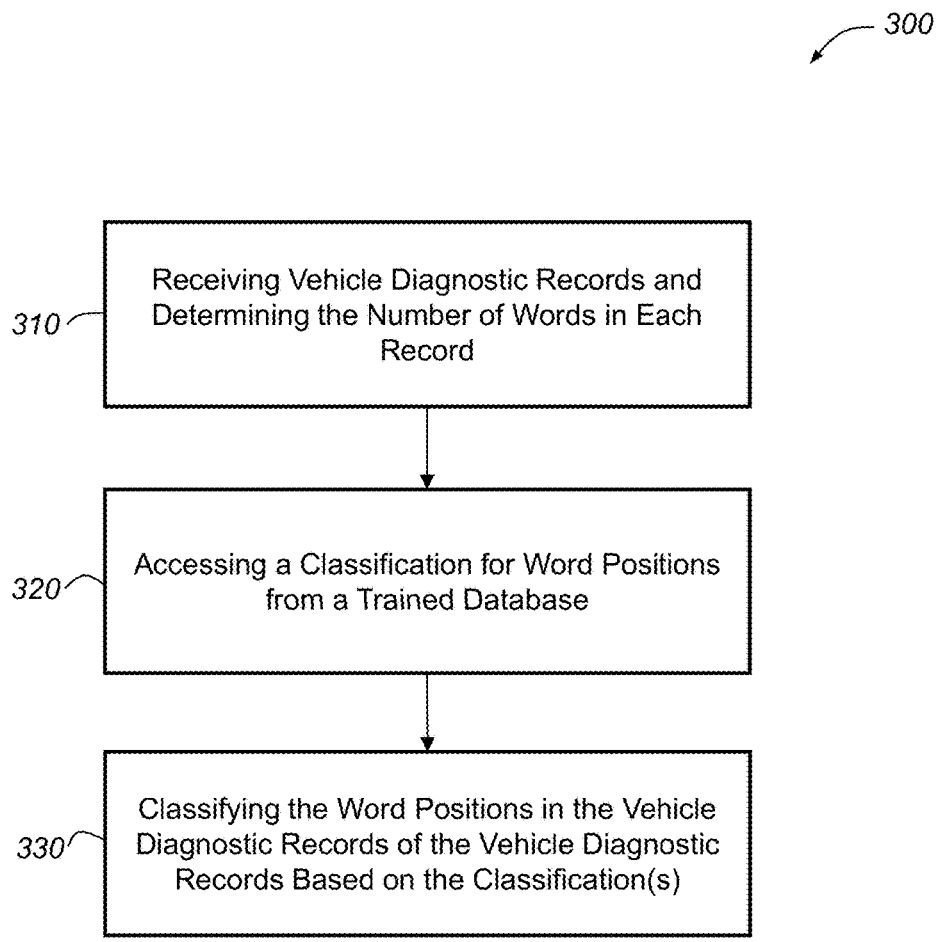
FIG. 3 is a flow chart depicting an embodiment of a method of analyzing vehicle diagnostic records using a trained database.

Turning to FIG. 3, a method 300 of analyzing vehicle diagnostic records is shown using the trained database. The method 300 begins at step 310 by receiving one or more vehicle diagnostic records and determining the number of words in each vehicle diagnostic record. As service centers create vehicle diagnostic records, the content of these records can be analyzed using the trained database. Words can be identified according to their position in the vehicle diagnostic record, extracted, and classified as being a part, a symptom, or an action. The vehicle diagnostic records can first be scanned to identify the number of words each record contains. Once the number of words has been determined, an entry is accessed in the trained database corresponding to the determined number of words. This can be carried out for each vehicle diagnostic record received and analyzed as part of the testing or use phase involving the trained database. The method 300 proceeds to step 320.

At step 320, a classification is accessed from the trained database for one or more word positions. For each vehicle diagnostic record, the trained database can provide the classification for each word position. In one example, a vehicle diagnostic record including 25 words can be analyzed. For 25 word vehicle diagnostic records, the trained database includes data indicating that certain word positions are classified as parts, symptoms or actions. For example, word positions 0-2, 15, and 6-7 can be classified as part words, symptom words, and action words, respectively. The method 300 proceeds to step 330.

At step 330, the word positions in the received vehicle diagnostics reports are classified based on the probably or predominant classification. The classifications obtained from the trained database can then be applied to the word positions of the vehicle diagnostic record. Continuing the example from step 320, the words found in positions 0-2, 15, and 6-7 in the 25 word vehicle diagnostic record can be extracted and stored as part words, symptom words, and action words, respectively. The part, symptom, and action words can be organized according to a wide range of different variables such as vehicle manufacturer, model, year of manufacture, options or features included with the vehicle to provide feedback regarding the performance of the vehicles as they are operated and after manufacture. The method 300 then ends.

Figure 4:
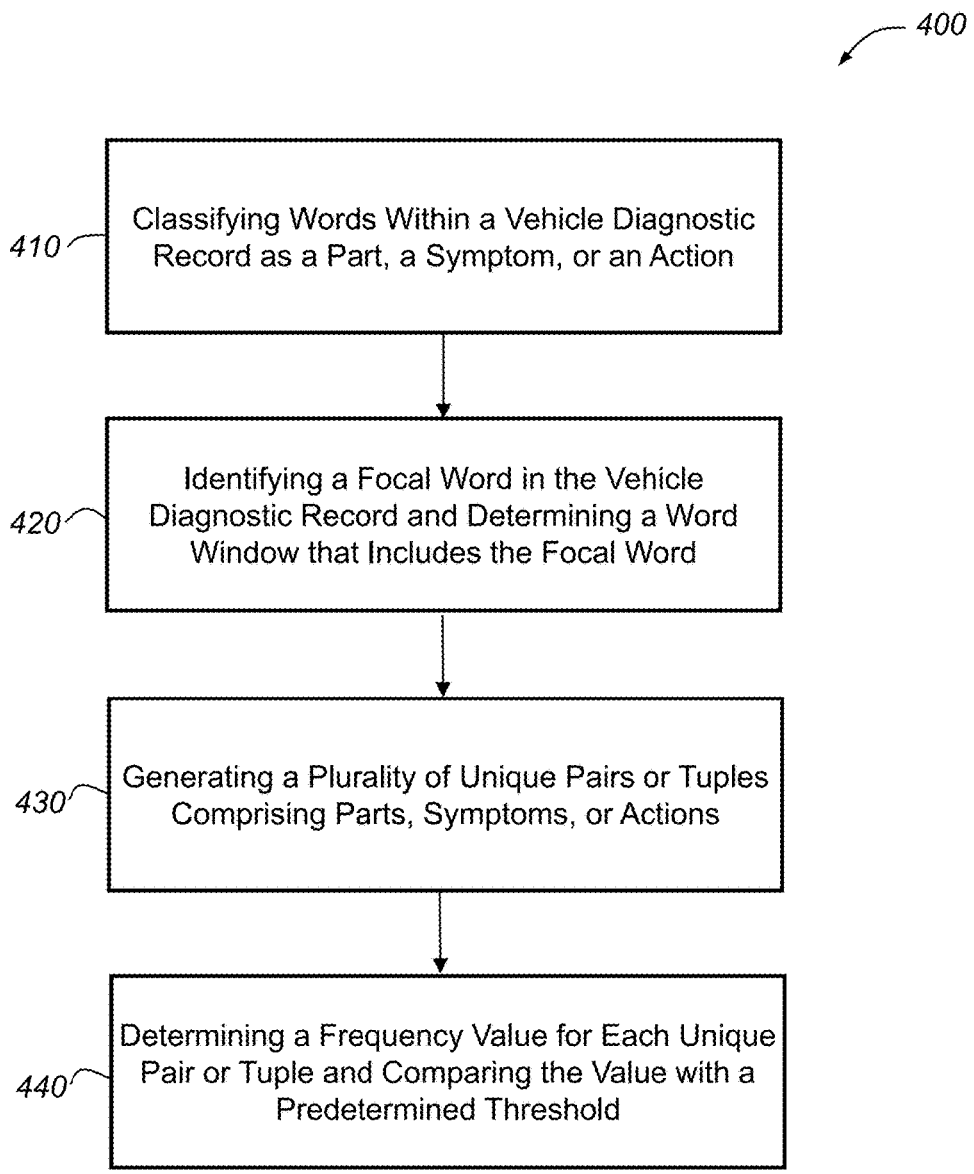
FIG. 4 is a flow chart depicting an embodiment of a method of analyzing content of multilingual vehicle diagnostic records.
Figure 5:
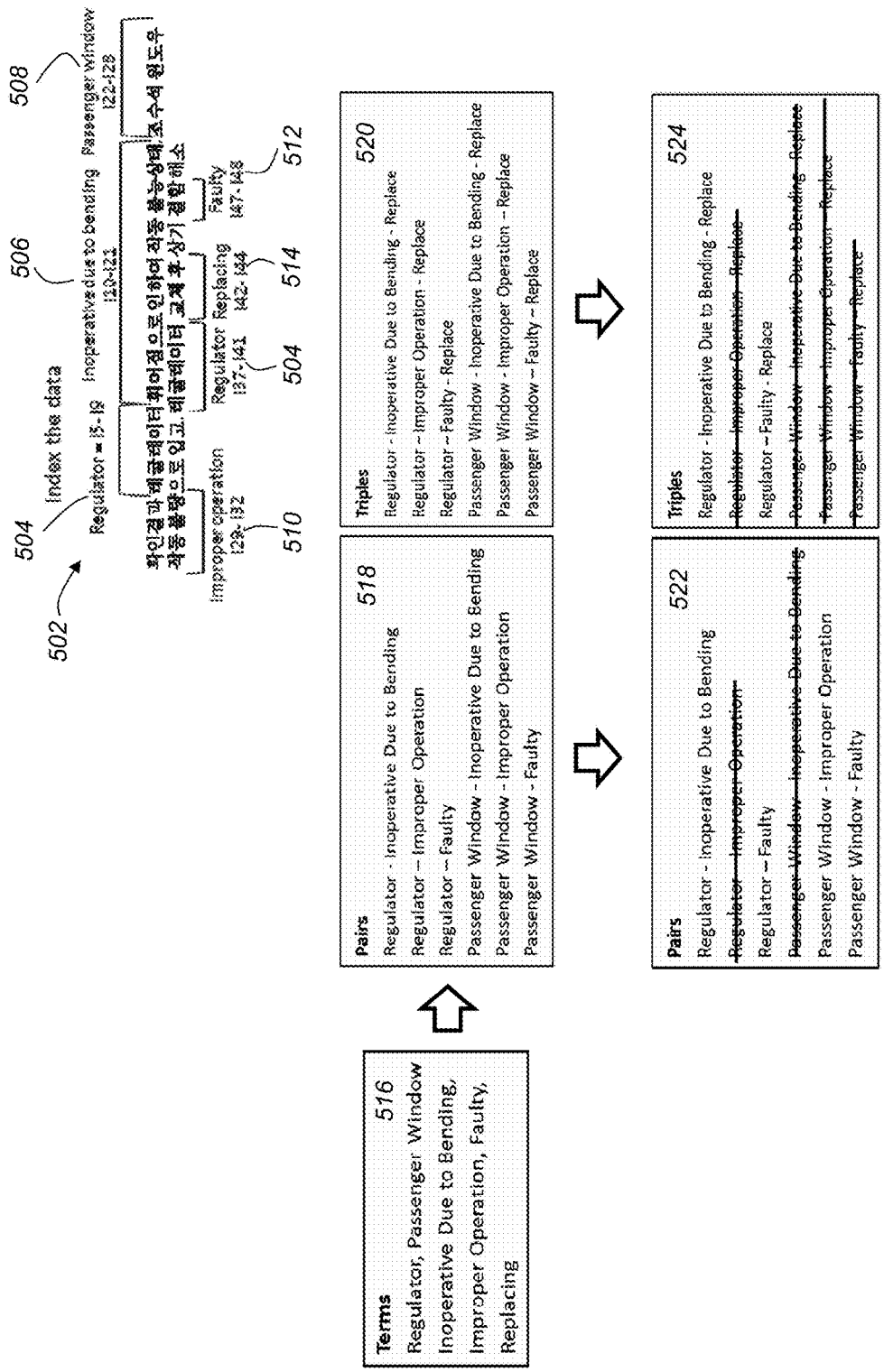
FIG. 5 is a flow chart depicting an embodiment of a method of analyzing content of multilingual vehicle diagnostic records.

FIGS. 4-5 depict another embodiment of a method 400 of analyzing content of vehicle diagnostic records. The method 400 begins at step 410 by classifying one or more words within a vehicle diagnostic record as a part, a symptom, or an action. Step 410 can be carried out as is described above with regard to steps 320-330 shown in FIG. 3. For a plurality of vehicle diagnostic records, word positions within those vehicle diagnostic records can be classified as parts, symptoms, or actions and then the method 400 proceeds to step 420.

At step 420, a focal word in the vehicle diagnostic record can be identified and a word window that includes the focal word is determined. Of the text included in the vehicle diagnostic record, a particular word or word position can be identified as the focal word and text within the vehicle diagnostic record preceding and following the focal word can be defined as the word window. The focal word and text within the word window can be analyzed with respect to the focal word. For instance, an engineer or vehicle designer may want more information relating to a particular part, symptom, or an action. The engineer can then identify the part, symptom, and action of interest as the focal word and then determine relationships that exist between other words representing parts, symptoms, and actions within the word window. While the term "focal word" is used, it should be apparent that it can refer to one word or a plurality of words that comprise a phrase. The word window can be defined as a quantity of words preceding or following the focal word in a vehicle diagnostic record. The preceding or following words are in close proximity to the focal word within a vehicle diagnostic record and can be relied on as being relevant to the focal word. The word window can be different sizes but in one exemplary implementation the word window includes three words or word positions preceding the focal word and three words or word positions following the focal word. However, it is possible to increase or decrease the size of the word window as desired.

An example can help explain how this could be carried out. For instance, a regulator can be identified as a part that will be designated as a focal word and a passenger window can be identified as another focal word. These focal words are identified in FIG. 5 as a first part 504 and a second part 508, respectively. Assuming that word positions 5-9 have been classified as the first part 504 "regulator" in vehicle diagnostic records, the word positions 2-4 and 10-12 can be defined as part of the word window. That is, word positions 2-4 and 10-12 preceding and following the focal word ("regulator") can be defined by having a three-word threshold preceding and following the focal word. In addition, another focal word ("passenger window" or the second part 508) can be a part classified at the word positions 37-41. Using the three-word threshold preceding and following the focal word "passenger window," the word window can include word positions 34-36 and 42-44 in addition to the focal word "passenger window." That is, the entire word window to be analyzed in the vehicle diagnostic record can lie between word positions 2-12 and 34-44. While described as being three words, the threshold can be larger or smaller. It is also possible to identify more than one focal word within a vehicle diagnostic record and include word positions preceding and following the focal word in the word window. The method 400 proceeds to step 430.

At step 430, a plurality of unique pairs or tuples comprising parts, symptoms, or actions are generated. Given a vehicle diagnostic record that includes word positions that have been classified as parts, symptoms, and/or actions as described above with respect to FIG. 3, the classified word positions can be combined into unique pairs, which can then be transformed into tuples. For example, FIG. 5 depicts an example of a vehicle diagnostic record 502, which represents how a plurality of vehicle diagnostic records have been classified into parts, symptoms, and actions. That is, the composite vehicle diagnostic record 502 includes a first part 504, a first symptom 506, a second part 508, a second symptom 510, a third symptom 512, and a first action 514. For explanation, the classified parts, symptoms, and actions in the composite vehicle diagnostic record 502 have been labeled as the terms REGULATOR, PASSENGER WINDOW, INOPERATIVE DUE TO BENDING, IMPROPER OPERATION, FAULTY, and REPLACING in box 516 shown in FIG. 5. These parts, symptoms, and actions represent words that may have associations within vehicle diagnostics records that have been generated by a fleet or an otherwise large quantity of vehicles. However, these parts, symptoms, and actions are not translated from one language in the vehicle diagnostic reports to another language and the plurality of vehicle diagnostic reports can be generated in different languages without translation to a common language. To identify relationships between parts, symptoms, and actions, an engineer or other user can identify parts, symptoms, or actions to be incorporated into pairs and tuples and the trained database can be used to detect relationships between these words. For instance, if the first part 504 and the second part 508 are identified by an engineer, relationships between the first part 504 and second part 508 can be determined by forming pairs and tuples.

To form unique pairs and tuples, the symptoms and actions within the word window are detected and combined with the first part 504 and the second part 508 into all of the possible combinations of pairs that can be formed. The unique pairs can be grouped to determine relationships between parts and symptoms, parts and actions, or symptoms and actions. Using the example shown in FIG. 5, one possible group of unique pairs is shown in box 518. Box 518 depicts an example of a part-symptom analysis of pairs that includes combinations of the first part 504 and the first symptom 506, the first part 504 and the second symptom 510, the first part 504 and the third symptom 512, the second part 508 and the first symptom 506, the second part 508 and the second symptom 510, and the second part 508 and the third symptom 512. In this example, six pairs are created and the symptoms can be found within the word window and combined with the first part 504 and the second part 508 included in the word window to form the pairs. So long as a symptom is within the word window, it can be used to form pairs with each of the first part 504 as well as the second part 508.

An example of tuples is shown in box 520. There the unique pairs have been expanded into tuples. To create the tuples, the symptoms identified in the pairs can become new focal words and actions that are determined to be within word windows surrounding the symptoms can be included in the tuples. For example, the actions within the word window defined by the first symptom 506, the second symptom 510, and the third symptom 512 can be added to the generated pairs. In this example, only one action ("replacing") is found in the word window so each pair can be converted to a tuple by adding the first action 514. The first part 504 and the second part 508 can each be associated with the first symptom 506, the second symptom 510, and the third symptom 512 and well as (in this example) the only action in the word window, first action 514, resulting in six tuples.

It should be understood that the vehicle diagnostic record 502 can be chosen based on one or more different selection variables. For instance, an engineer or user may want to identify a subset of vehicles belonging to a vehicle fleet using one or more selection variables. Selection variables can be used to determine which vehicles are included in the subset and include a range of vehicle identification numbers (VINs), a particular vehicle model year, a particular model, vehicles located in a particular area, vehicles built during a defined time period, date ranges when the vehicle diagnostic record was created, and mileage ranges, to name a few. By choosing one or more selection variables, an engineer can customize the vehicles or aspects of the vehicles used to choose the vehicle diagnostic record 502. The method 400 proceeds to step 440.

At step 440, a frequency value for each unique pair or tuple is determined and compared with a predetermined threshold. The unique pair or tuple can be determined using a term frequency inverse document frequency matrix shown below as equation (1).

$$(T_w)_{i,j} = T_{i,j} * idf_{Ti} \quad (1)$$

$$T_{i,j} = \frac{n_{i,j}}{\sum_k n_{k,j}} \quad (2)$$

where, $n_{i,j}$ is the number of co-occurrences of a given tuple, $T_i$, that appears in a vehicle diagnostic record $T_j$ and the denominator is the sum of number of co-occurrence of all tuples in $T_j$ $$idf_{Ti} = \frac{\log|V|}{|\{v:T_i \in v\}|} \quad (3)$$

where, $|V|$ total number of vehicle diagnostic records in a corpus
$\{v: T_i \in v\}$ number of vehicle diagnostic records with $T_i$.

After generating unique pairs or tuples, one or more of the pairs or tuples can be deleted based on the frequency with which the pair or tuple appears in the trained database of vehicle diagnostic records. The frequency of pairs and tuples can be controlled by establishing a predetermined threshold at or above which the pair/tuple can be labeled as valid and below which can be deleted. The trained database can be searched to determine how many times the pair or tuple appears. If the number of times is the same or greater than the predetermined threshold, the pair or tuple remains or is labeled as valid. However, if the pair or tuple does not appear the predetermined threshold amount of times, the pair or tuple is deleted. Using the example of pairs and tuples shown in box 518 and box 520, respectively, one or more of the pairs/tuples can be deleted or eliminated as shown in box 522 (pairs) and box 524 (tuples). In each of the boxes 522 and 524, pairs and tuples have been deleted as shown using strikethrough.

The pairs and tuples that have their term frequency above a specific threshold can be retained as useful ones from the data. These can be considered as features of the data and used to cluster repair diagnosis data. Frequently, co-occurring term based clustering can be used to generated data clusters, such as part-based clusters (used to generate the clusters of faulty/failed parts in the data) and part-symptom based clustering (used to identify the symptoms associated with the faulty/failed parts). It should be appreciated that the present method 400 can be used to cluster various combinations of parts, symptoms, failure modes, and actions. For example, a symptom-failure mode based clustering can be arranged like the part or part-symptom clusters but instead of clustering symptoms with parts, it can cluster failure modes with symptoms. Part-symptom-action based clustering can then identify the repair actions used to fix the faulty parts.

In a part-based clustering algorithm, let $D=(d_1, d_2, \ldots, d_n)$ represent a set of vehicle diagnostic records and $\mathbb{P} =(P_1, P_2, \ldots, P_n)$ represent a set of parts that are annotated and extracted. Each vehicle diagnostic record, $d_k$, can be represented in terms of the extracted parts such that $d_k=(f_{P1}, f_{P2}, \ldots, f_{Pn})$, where $f_{Pk}$ represents the frequency of critical $P_k \in \mathbb{P}$ in repair verbatim $d_k \in D$ because it may help to reduce the document dimensions. The output of this clustering algorithm is a set of clusters, $(C_{P1}, C_{P2}, \ldots, C_{Pn}) \in C$. The following steps can be used in the part-based clustering algorithm. First, all parts in $\mathbb{P}$ can be sorted based on their frequencies. Next, in each iteration a vehicle diagnostic record, $d_n$, with the record of $P_n$ can be identified as a candidate that can be assigned to a cluster. The number of clusters may be equal to the number of parts in $\mathbb{P}$. If a cluster $C_{Pn}$ belongs to part $P_n$ then we can say that $P_n$ is the cluster label of $C_{Pn}$. However, before assigning $d_n$ to a specific cluster the algorithm can check whether $P_n$ is recorded at least twice in $d_n$ by using the term frequency function. This check can be carried out because each vehicle diagnostic record may include three segments—a customer segment, a correction segment, and a cause segment and if $P_n$ is recorded only in a single segment, which does not have any symptoms or actions co-occurring with $P_n$, then limited support may exist for the algorithm to consider the vehicle diagnostic record as a candidate record that includes a faulty part. After assigning each vehicle diagnostic record from D to a specific cluster, the two most similar clusters can be merged by using the following two conditions. With respect to the first condition, the parts may be written using an inconsistent vocabulary, say $P_i$ and $P_j$ (e.g. 'PC Module', 'PCM'), which results in an inconsistent assignment of corresponding vehicle diagnostic records to different clusters, $C_{pi}$ and $C_{pj}$ when in theory such clusters should be merged into a single cluster to maintain consistency. The $C_{pi}$ and $C_{pi}$ can be merged $C_{pi} \cup C_{pi} = C_{pn}$ by calculating the average pairwise proximity between objects in $C_{pi}$ and $C_{pi}$ using the average linkage shown in equation (4).

$$D(C_{pi}, C_{pj}) = \frac{1}{N_{Cpi} * N_{Cpj}} \sum_{i=1}^{N_{Cpi}} \sum_{j=1}^{N_{Cpj}} d(x_i, y_j) \quad (4)$$

$$x_i \in C_{pi}, y_j \in C_{pj}$$

where, $d(x_i, y_j)$ is the distance between objects $x_i \in C_{pi}$ and $y_j \in C_{pi}$ from $C_{pi}$ and $C_{pj}$, $N_{Cpi}$ and $N_{Cpj}$ are the total number of repair verbatim in $C_{pi}$ and $C_{pj}$ respectively.

Using equation (4), we may not be able calculate the average pairwise proximity between the parts directly due to the vocabulary mismatch, hence the proximity between $C_{pi}$ and $C_{pj}$ may be determined by calculating an average pairwise distance between the symptoms, $(s_1, \ldots, s_k) \in x_i$ and $(s_1, \ldots, s_n) \in y_j$ co-occurring with $P_i$ and $P_j$ in $C_{pi}$ and $C_{pj}$ respectively. The average pairwise distance between symptoms co-occurring with $P_i$ and $P_j$ can be calculated because based on our domain understanding even if the same part is written by using an inconsistent vocabulary the same set of symptoms co-occur with the term variations in the vehicle diagnostic records. With respect to the second condition, the clusters may also be merged if the parts in a vehicle diagnostic record are assigned to two different clusters are associated to the same system. In each iteration after merging the clusters the distance between remaining clusters can be updated.

The part-symptom based clustering can take the clusters $(\mathbb{C}_{P1}, \mathbb{C}_{P2}, \ldots, \mathbb{C}_{Pn}) \in \mathbb{C}$ constructed by part-based clustering and the tuples (Part, Symptom) as input. Here, each vehicle diagnostic record, $d_j$ can be represented in terms of the part-symptom such that $d_j = (f_{(P1\ Si)}, f_{(P2\ Sk)}, \ldots, f_{(Pn\ Sn)})$, where $f_{(Pn\ Sn)}$ represents the frequency of critical tuples in a repair verbatim $d_j \in \mathbb{D}$. This algorithm constructs as output the clusters, $((P_1(S_i, \ldots, S_n)), (P_2(S_j, \ldots, S_m)), \ldots, (P_n(S_k, \ldots, S_n))) \in \mathbb{C}_s$, where each cluster consists of vehicle diagnostic records with parts $P_n$ associated to a same system and the symptoms associated with $P_n$. The following steps can be used to carry out the part-symptom clustering. During a first pass, each vehicle diagnostic record from $\mathbb{C}_{Pn}$ can be assigned to its own individual sub-cluster if an associated vehicle diagnostic record consists of the valid symptom $S_k$ that is a member of tuples (Part$_i$ Symptom$_j$). If the cluster $(P_n(S_k, \ldots, S_n))$ belongs to part-symptom pair $(P_n\ S_m)$ then $(P_n\ S_m)$ can be the cluster label of $(P_n(S_k, \ldots, S_n))$. Next the clusters of vehicle diagnostic records can be merged with each other if the vehicle diagnostic records from two different clusters consists of the symptoms, which can be used to observe the same failure mode associated with $P_n$. Initially, the co-occurrence frequency of $(P_n\ S_j)$ in two different clusters can be calculated and $(P_n\ S_j)$ above a specific threshold may be retained. During the first pass, the clusters with the pairs $(P_n\ S_j)$ below a specific threshold can be collected in a separate group, but there is a possibility that the symptoms in the separate group observe the same failure mode. In a second pass, the mechanism can iteratively check if any symptom, $S_k$ from the separate group observes the same failure mode associated with $P_n$ and all the vehicle diagnostic records with $S_k$ can be re-assigned to the appropriate clusters constructed in the first pass.

Next, a part-symptom-action based clustering algorithm can take the clusters $(\mathbb{C}_{(P1Si)}, \mathbb{C}_{(P2Si)}, \ldots, \mathbb{C}_{(PnSm)}) \in \mathbb{C}_s$ constructed by the part-symptom clustering algorithm and the tuple (Part$_i$ Symptom$_j$ Action$_k$) as input. Similar to the previous two algorithms, here each repair verbatim $d_j$ can be represented in terms of the part-symptom-action tuples such that $d_j = (f_{(P1\ Si\ Ak)}, f_{(P1\ Sj\ Al)}, \ldots, f_{(Pn\ Sm\ Ap)})$, where $f_{(Pn\ Sm\ Ap)}$ represents the frequency of critical tuples in vehicle diagnostic records $d_j \in \mathbb{D}$. This algorithm construct as output the clusters of the form $((P_1(S_1(A_i, \ldots, A_j)), \ldots, S_n(A_k, A_n))), \ldots, (P_n(S_1(A_m, \ldots, A_p), \ldots, S_m(A_a, \ldots, A_s)))) \in \mathbb{C}_A$, where a part may be associated with a specific system, the corresponding symptoms can observe the same failure mode, and a set of repair actions may be used to fix the same symptom.

The following steps can be used to carry out a part-symptom-action based clustering algorithm. In a first pass, each vehicle diagnostic record from $\mathbb{C}_s$ can be assigned to its own sub-cluster if it consists of a record of valid action $A_k$. If the cluster $(P_n(S_1(A_m, \ldots, A_p), \ldots, S_m(A_a, \ldots, A_s)))$ belongs to part-symptom-action tuple $(P_n\ S_m\ A_m)$ then the $(P_n\ S_m\ A_m)$ can represents the cluster label of $(P_n(S_1(A_m, \ldots, A_p), \ldots, S_m(A_a, \ldots, A_s)))$. The $A_k$ may be a valid action if it is a member of the tuples (Part$_i$ Symptom$_j$ Action$_k$). The algorithm can further verify the validity of associations between $P_n$ and the actions by using the vehicle architecture information. The newly constructed clusters can be merged provided a set of vehicle diagnostic records from the two different clusters consist of actions that fix the same symptom. Initially, the co-occurrence frequency of each triple $(P_i(S_j(A_k)))$ from the two different clusters can be calculated and the tuples with their frequency above a specific threshold may be retained. The tuples with the frequency below a specific threshold can be collected in a separate group. In a second pass, the algorithm can check whether the actions from the separate group fixes any of the valid symptoms, which may be identified in the first pass and the corresponding vehicle diagnostic records are re-assigned to the appropriate clusters constructed in the first pass. The method 400 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of analyzing content of multilingual vehicle diagnostic records to identify data features in the vehicle diagnostic records independent of the language of the diagnostic record, the method comprising the steps of:
   (a) electronically receiving at a central facility computer multilingual vehicle diagnostic records;
   (b) using a trained database, classifying one or more words within each of the vehicle diagnostic records as a part, a symptom, or an action based on the position of each word within the vehicle diagnostic records;
   (c) determining a word window within each vehicle diagnostic record that identifies particular parts, symptoms, or actions;
   (d) using the trained database, determining relationships between the parts, symptoms, or actions based on pairs or tuples formed from combinations of the parts, symptoms, or actions within the word window;

(e) determining a frequency value for each pair or tuple using the trained database;
(f) comparing the determined frequency value with a predetermined threshold, and identifying each pair or tuple as a data feature of the diagnostic record when the determined frequency value is equal to or above the predetermined threshold; and
(g) storing the data features identified in step (f) for each of the multilingual vehicle diagnostic records received in step (a), wherein the data features enable analysis of content in the vehicle diagnostic records independent of the content language.

2. The method of claim 1, further comprising the step of identifying a focal word within the word window.

3. The method of claim 1, further comprising the step of deleting one or more pairs or tuples when the determined frequency value is not equal to or above the predetermined threshold.

4. The method of claim 1, wherein the frequency value is obtained by determining the number of times the pairs or tuples appear in the trained database.

5. The method of claim 1, wherein step (c) further comprises forming the tuples based on content from the pairs.

6. A method of analyzing content of multilingual vehicle diagnostic records to identify data features in the vehicle diagnostic records independent of the language of the diagnostic record, the method comprising the steps of:
(a) electronically receiving at a central facility computer multilingual vehicle diagnostic records;
(b) identifying a position for each of the words in the vehicle diagnostic records;
(c) using a trained database, classifying one or more words within each of the vehicle diagnostic records as a part, a symptom, or an action based on the position of each word;
(d) identifying a focal word in each vehicle diagnostic record;
(e) determining a word window that includes the focal word;
(f) generating a plurality of unique pairs or tuples representing combinations of parts, symptoms, or actions within the word window;
(g) determining a frequency value for each unique pair or tuple using a trained database;
(h) comparing the determined frequency value with a predetermined threshold, and identifying each unique pair or tuple as a data feature of the diagnostic record when the determined frequency value is equal to or above the predetermined threshold; and
(i) storing the data features identified in step (h) for each of the multilingual vehicle diagnostic records received in step (a), wherein the data features enable analysis of content in the vehicle diagnostic records independent of language.

7. The method of claim 6, further comprising the step of deleting one or more pairs or tuples when the determined frequency value is not equal to or above the predetermined threshold.

8. The method of claim 6, wherein the pair or tuple comprising part, symptoms, or actions includes words found within the word window.

9. The method of claim 6, wherein the frequency value is obtained by determining the number of times the pairs or tuples appear in the trained database.

10. The method of claim 6, wherein step (d) further comprises generating the tuples based on content from the pairs.

11. A method of analyzing content of multilingual vehicle diagnostic records to identify data features in the vehicle diagnostic records independent of the language of the diagnostic record, the method comprising the steps of:
(a) electronically receiving at a central facility computer multilingual vehicle diagnostic records;
(b) obtaining classifications from a database trained to classify words according to the position of the words in the vehicle diagnostic records;
(c) classifying one or more words within each of the vehicle diagnostic records as a part, a symptom, or an action based on the position of each of the one or more words within the vehicle diagnostic records by applying the classifications obtained in step (b);
(d) identifying a focal word in each of the vehicle diagnostic records;
(e) determining a word window that includes the focal word;
(f) generating a plurality of unique pairs or tuples representing combinations of parts, symptoms, or actions within the word window;
(g) determining a frequency value for each unique pair or tuple using a trained database;
(h) comparing the determined frequency value with a predetermined threshold, and identifying each unique pair or tuple as a data feature of the diagnostic record when the determined frequency value is equal to or above the predetermined threshold; and
(i) storing the data features identified in step (h) for each of the multilingual vehicle diagnostic records received in step (a), wherein the data features enable analysis of content in the vehicle diagnostic records independent of language.

12. The method of claim 11, further comprising the step of deleting one or more pairs or tuples when the determined frequency value is not equal to or above the predetermined threshold.

13. The method of claim 11, wherein the frequency value is obtained by determining the number of times the pairs or tuples appear in the trained database.

14. The method of claim 11, wherein step (f) further comprises generating the tuples based on content from the pairs.

15. The method of claim 1, further comprising clustering vehicle diagnostic data using the data features.

16. The method of claim 15, wherein clustering vehicle diagnostic data using the data features includes clustering combinations of data features relating to parts, symptoms, failure modes, or actions.

* * * * *